(12) United States Patent
Hu et al.

(10) Patent No.: US 10,986,699 B2
(45) Date of Patent: *Apr. 20, 2021

(54) THERMALLY CONDUCTIVE, ELECTRICALLY INSULATING PROTECTION LAYER FOR DE-ICING HEATERS

(71) Applicant: Goodrich Corporation, Charlotte, NC (US)

(72) Inventors: Jin Hu, Hudson, OH (US); Galdemir Cezar Botura, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 773 days.

This patent is subject to a terminal disclaimer.

(21) Appl. No.: 15/271,003

(22) Filed: Sep. 20, 2016

(65) Prior Publication Data

US 2018/0084613 A1    Mar. 22, 2018

(51) Int. Cl.
| | | |
|---|---|---|
| H05B 3/34 | (2006.01) |
| H05B 3/14 | (2006.01) |
| B64D 45/00 | (2006.01) |
| B32B 5/02 | (2006.01) |
| B32B 7/12 | (2006.01) |

(Continued)

(52) U.S. Cl.
CPC .............. H05B 3/342 (2013.01); B32B 5/02 (2013.01); B32B 7/12 (2013.01); B64D 15/12 (2013.01); B64D 45/00 (2013.01); H05B 1/0236 (2013.01); H05B 3/14 (2013.01); H05B 3/34 (2013.01); B32B 2255/02 (2013.01); B32B 2260/023 (2013.01); B32B 2260/046 (2013.01); B32B 2262/101 (2013.01); B32B 2262/105 (2013.01); B32B 2262/106 (2013.01); B32B 2307/206 (2013.01); B32B 2307/302 (2013.01); B32B 2457/00 (2013.01); B32B 2605/18 (2013.01); H05B 2203/015 (2013.01); H05B 2203/017 (2013.01); H05B 2214/02 (2013.01); H05B 2214/04 (2013.01)

(58) Field of Classification Search
CPC ........ B32B 2260/023; B32B 2260/046; B32B 2262/101; B32B 2262/105
USPC ..... 219/202, 203, 553; 428/77, 292.1, 293.1
See application file for complete search history.

(56) References Cited

U.S. PATENT DOCUMENTS

| 6,237,874 B1 * | 5/2001 | Rutherford ............ B64D 15/14 244/134 D |
| 8,931,740 B2 * | 1/2015 | Nordin ..................... B64C 3/20 244/134 D |

(Continued)

FOREIGN PATENT DOCUMENTS

| EP | 2963995 A1 | 1/2016 |
| GB | 2445458 A | 7/2008 |
| WO | WO2012015472 A1 | 2/2012 |

OTHER PUBLICATIONS

Extended European Search Report for EP Application No. 17192225. 5, dated Feb. 27, 2018, 8 Pages.

*Primary Examiner* — Thien S Tran
(74) *Attorney, Agent, or Firm* — Kinney & Lange, P. A.

(57) ABSTRACT

Disclosed is the use of a boron nitride nanotube (BNNT) fabric as a skin for protection of nano-carbon heaters used for de-icing aircrafts or other vehicles. This allows the heaters to be resistant to hail, bird, and other mechanical striking damages, and can be applied to parts of aircraft that require acoustic protection.

16 Claims, 7 Drawing Sheets

(51) Int. Cl.
*B64D 15/12* (2006.01)
*H05B 1/02* (2006.01)

(56) References Cited

U.S. PATENT DOCUMENTS

| | | | | |
|---|---|---|---|---|
| 2003/0003287 | A1* | 1/2003 | Tobita | C08J 5/046 |
| | | | | 428/297.4 |
| 2006/0035548 | A1* | 2/2006 | Goto | B29B 15/122 |
| | | | | 442/65 |
| 2007/0224451 | A1* | 9/2007 | Chandran | C04B 35/16 |
| | | | | 428/698 |
| 2011/0180524 | A1* | 7/2011 | Brittingham | C08J 3/18 |
| | | | | 219/202 |
| 2012/0186742 | A1* | 7/2012 | Kang | B32B 5/26 |
| | | | | 156/324 |
| 2013/0028738 | A1* | 1/2013 | Nordin | H05B 3/145 |
| | | | | 416/39 |
| 2014/0014640 | A1* | 1/2014 | Calder | B64D 15/12 |
| | | | | 219/202 |
| 2015/0076137 | A1* | 3/2015 | Kim | H05B 3/20 |
| | | | | 219/553 |
| 2016/0137502 | A1* | 5/2016 | Hopkins | C01B 21/0641 |
| | | | | 428/77 |
| 2016/0221680 | A1* | 8/2016 | Burton | B64D 15/12 |

\* cited by examiner

THERMALLY CONDUCTIVE, ELECTRICALLY INSULATING PROTECTION LAYER FOR DE-ICING HEATERS

BACKGROUND

An aircraft moving through the air is often subjected to ice formation, and anti-icing or de-icing devices must be used to remove or prevent ice from accumulating on exterior surfaces of the aircraft. For any type of electrical heaters or de-icing heaters, the closer the heater is to the skin of an airfoil, nacelle, nosecone, engine cowl, or other aircraft part, the less power it takes to heat or de-ice the aircraft element due to the proximity of the heater to the external surface. Thus, aerospace applications of de-icing heaters attempt to place those heaters as close to the external surface, as possible. However, heaters used for de-icing on aircrafts are often subject to foreign object damage (FOD), such as hail, bird strikes, and other debris, particularly when those heaters are placed too close to the surface. Ideally, the heater uses minimal power to accomplish de-icing but is protected from FOD.

The materials used to protect heaters used for de-icing must be thermally conductive, allowing transfer of heat between the heater and the external surface of the aircraft element, but must also be electrically insulating to prevent shorting of the heater. Most thermally conductive materials are also electrically conductive, limiting the choice of materials.

SUMMARY

A heating assembly includes a boron nitride nanotube fabric; a first adhesive; a heating element, wherein the boron nitride nanotube fabric is attached to the heating element by the first adhesive; a second adhesive; and a glass pre-preg fabric, wherein the glass pre-preg fabric is attached to the heating element by the second adhesive on a side of the heating element opposite the boron nitride nanotube fabric.

A method for making a heating assembly includes obtaining a boron nitride nanotube fabric; bonding the boron nitride nanotube fabric to a heating element with a first adhesive; bonding the heating element to a glass pre-preg fabric with a second adhesive; and curing the assembly.

DETAILED DESCRIPTION

A de-icing heater can be protected by strong, thermally conductive but electrically insulating material such as boron nitride nanotube (BNNT) fabric. BNNT fabric is strong enough to mitigate mechanical damage from bird strikes, hail, or other foreign object damage (FOD) when a heater is attached near an external surface of an aircraft. BNNT fabric additionally provides acoustic insulation, and can protect a de-icing heater on a breeze side of an airfoil or other aircraft structure from vibrational disturbances.

Figure 1A:
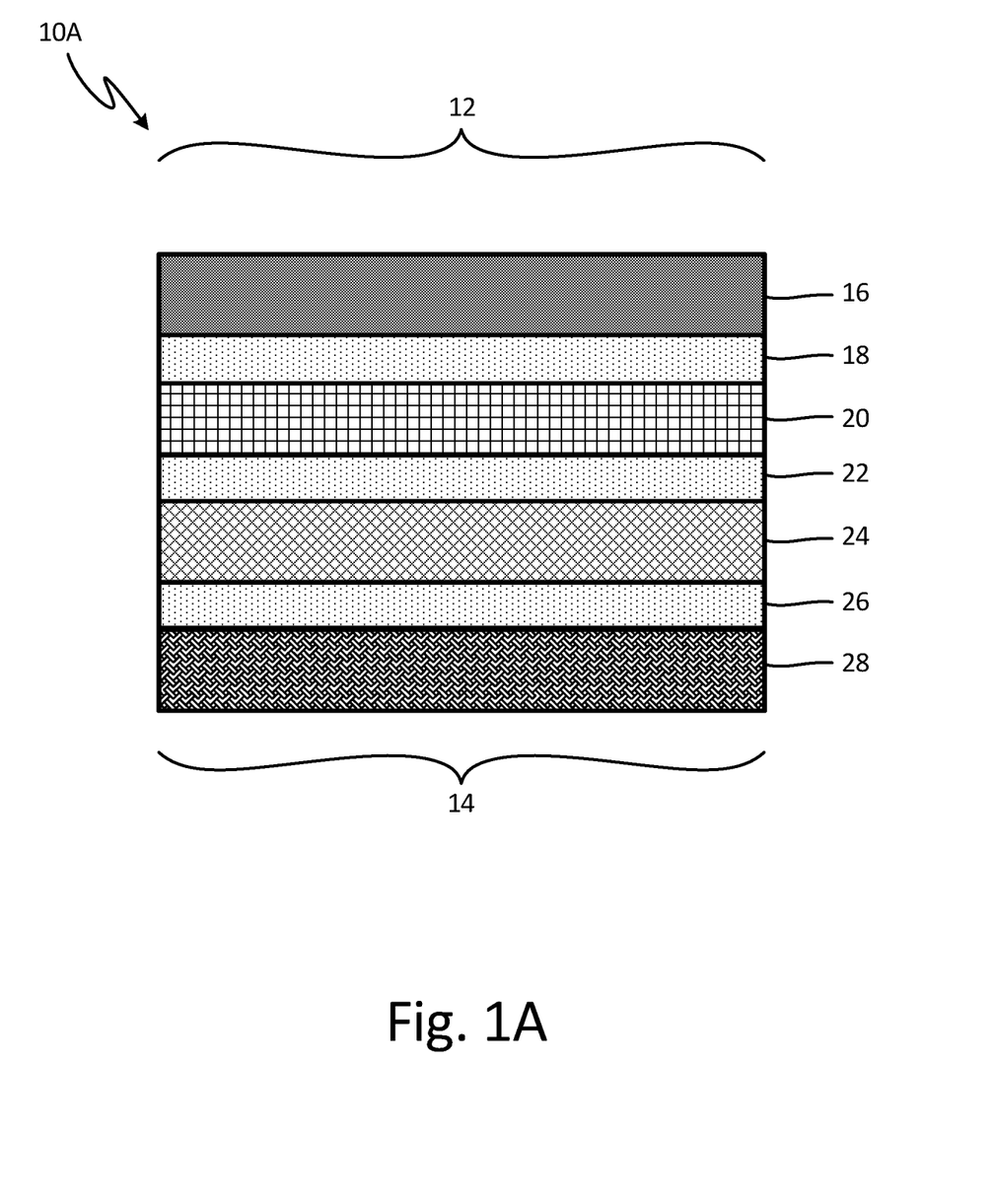
FIG. 1A is a schematic diagram of a thermally conductive, electrically insulated protected heater assembly.

FIGS. 1A-1E will be discussed together. FIG. 1A is schematic diagram of a thermally conductive, electrically insulated protected heater assembly 10A. Assembly 10A has breeze size 12 and bond side 14. Breeze side 12 faces an external environment and is subject to icing. Bond side 14 can be attached to part of an aircraft, such as an airfoil or other element. Assembly 10A includes metallic skin 16, first film adhesive 18, boron nitride nanotube (BNNT) pre-preg fabric 20, second film adhesive 22, electric heater 24, third film adhesive 26, and glass pre-preg fabric 28. Metallic skin 16 is attached to BNNT pre-preg fabric 20 by first film adhesive 18. BNNT pre-preg fabric 20 is attached to electric heater 24 through second film adhesive 22. Electric heater 24 is attached to glass pre-preg fabric 28 by third film adhesive 26. Glass pre-preg fabric 28 can be attached to an aircraft component (not pictured).

On breeze side 12 of heating assembly 10A is metallic skin layer 16, which is connected to BNNT pre-preg fabric 20 by first film adhesive 18. First film adhesive 18 can be a commercially available adhesive which is thermally conductive. First film adhesive 18 can be the same or different from second and third adhesives 22, 26. Skin layer 16 is a metallic or alloy-based skin designed to prevent foreign object damage to electric heater 24. Because skin layer 16 is electrically conductive, it should not be directly adhered to electric heater 24. Instead, BNNT pre-preg fabric 18 is sandwiched between skin layer 16 and electric heater 24.

BNNT pre-preg fabric 18 is a nontoxic, electrically insulating, and thermally conductive fabric material made of boron nitride nanotubes and an appropriate polymer resin. Its high strength is similar to the strength of carbon nanotubes (CNT), which have been used as a bullet-proof material and in a variety of aerospace applications.

BNNTs are a type of one-dimensional nanostructure that are a close analogue to carbon nanotubes (CNTs), but are comprised of hexagonal B—N bond networks. BNNT bonds have partial ionic character due to the difference in electronegativity of nitrogen and boron. This causes BNNTs to be electrically insulating while CNTs are generally semiconductors. Moreover, BNNTs exhibit thermal conductivity, thermal stability, chemical stability and, when in fabric form, superhydrophobicity. Thus, BNNTs share mechanical properties of CNTs, but have additional advantages such as greater thermal and chemical stability, and optical and infrared transparency.

To create the BNNT fabric, BNNT is grown in a laboratory. Several methods of synthesizing BNNTs can be used, including catalyst-based chemical vapor deposition, ball-milling and annealing methods, arc-discharge, plasma-enhanced pulsed laser deposition, laser vaporization, or other methods. The BNNTs are then impregnated with a polymer resin, such as an epoxy, a phenolic polymer or a bismaleimide. The fabric is then cured before being used. Alternatively, some BNNT fabrics are commercially available.

BNNT pre-preg fabric 20 is connected to electric heater 24 by second film adhesive 22. Second film adhesive 22 can be a commercially available adhesive. Second film adhesive 22 can be the same or different from first adhesive 18. Electric heater 24 can be a nano-carbon heater or a resistive heater. Resistive heaters are comprised of metals or metal alloys, and are more cost-efficient, but higher weight than carbon alternatives. Nano-carbon heaters can be made of carbon nanotubes (CNTs), graphene, or graphene nanoribbons (GNTs). Carbon allotrope heaters are uniquely beneficial for de-icing because of their high efficiency, light weight, low cost, ability to be molded into specific shapes, and durability.

BNNT pre-preg fabric 20 protects electric heater 24 from foreign object damage (FOD), such as hail, bird strikes, or other events that may damage electric heater 24. BNNT is thermally conducting, so heat from electric heater 24 can still move to breeze side 12 and work to de-ice the aircraft part, but is electrically insulating, so electric heater 24 is not shorted. BNNT pre-preg fabric 20 helps to ensure electric heater 24 can still de-ice aircraft parts, but is more resistant to FOD.

Electric heater 24 turns electric current received from a power source (not pictured) into heat, preventing ice formation on an aircraft element such as an airfoil, nacelle, nosecone, engine cowl, or other aircraft part. While electric heater 24 is de-icing an aircraft element, BNNT pre-preg fabric 20 protects electric heater 24 from FOD and electrically insulates electric heater 24. Additionally, BNNT pre-preg fabric 20 is acoustically insulating. Thus, the aircraft element and electric heater 24 are protected from acoustic vibrations during operation of aircraft.

Glass pre-preg fabric 28 is attached to electric heater 24 by third film adhesive 26. Third film adhesive 26 is a commercially available adhesive, and can be the same or different from first and second adhesives 18 and 22. Glass pre-preg fabric 28 can be a commercially available glass pre-preg fabric. Glass pre-preg fabric 28 protects electric heater 24 on bond side 14 of heating assembly 10A. Glass pre-preg fabric 28 can be attached to an element of an aircraft (not pictured), such as an airfoil, nacelle, nosecone, engine cowl, or other aircraft part.

Figure 1B:
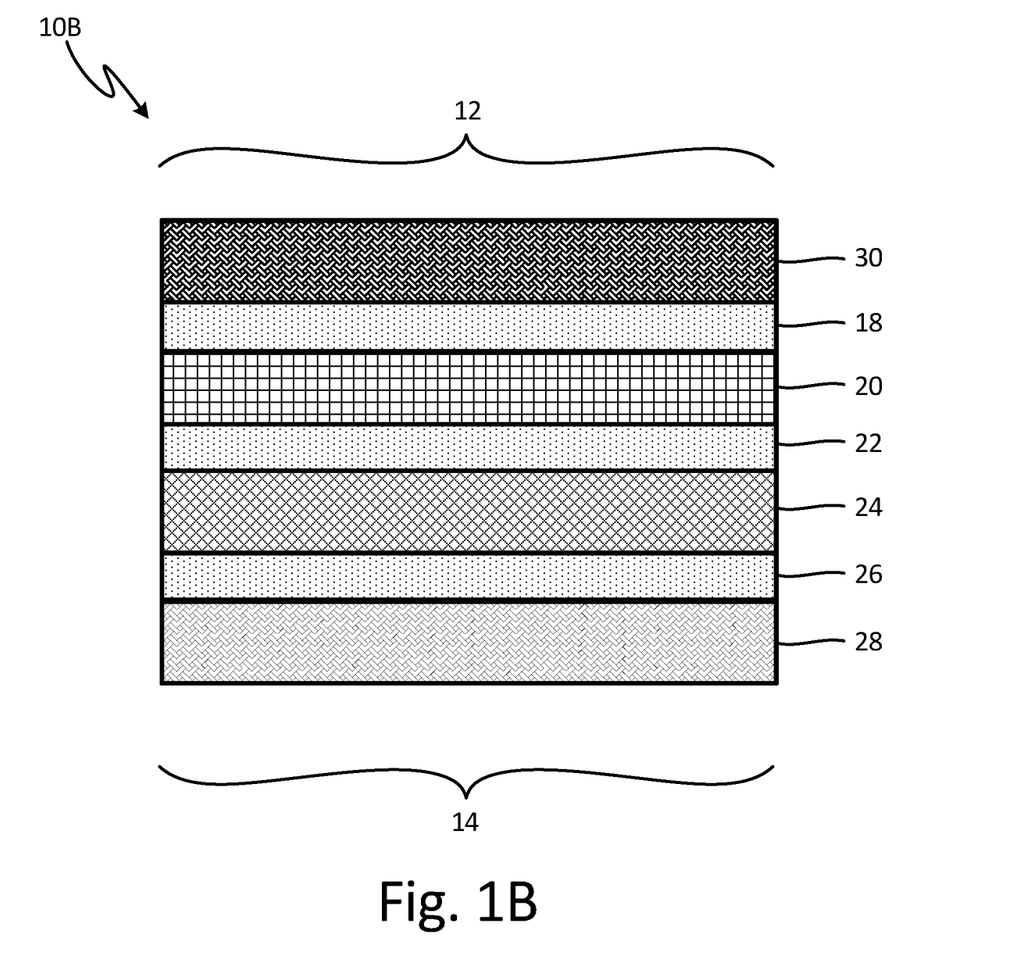
FIG. 1B is a schematic diagram of a thermally conductive, electrically insulated protected heater assembly in a different embodiment.
Figure 1C:
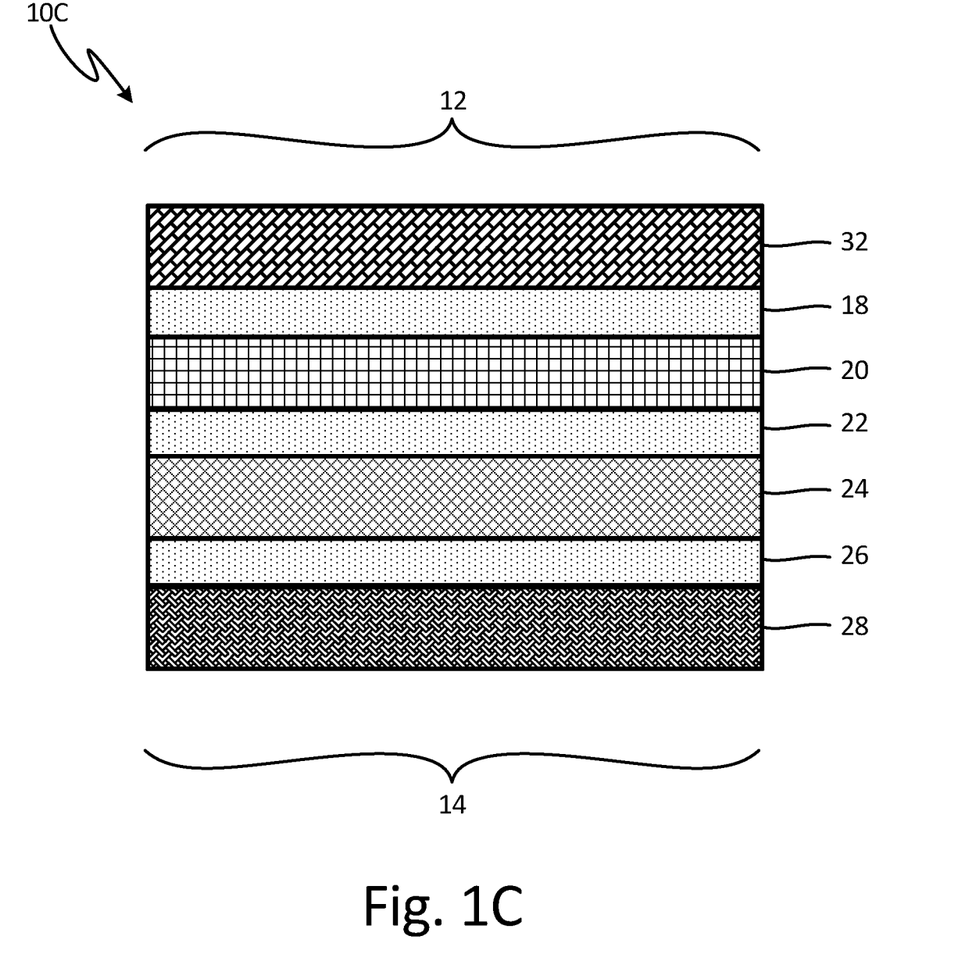
FIG. 1C is a schematic diagram of a thermally conductive, electrically insulated protected heater assembly in a different embodiment.
Figure 1D:
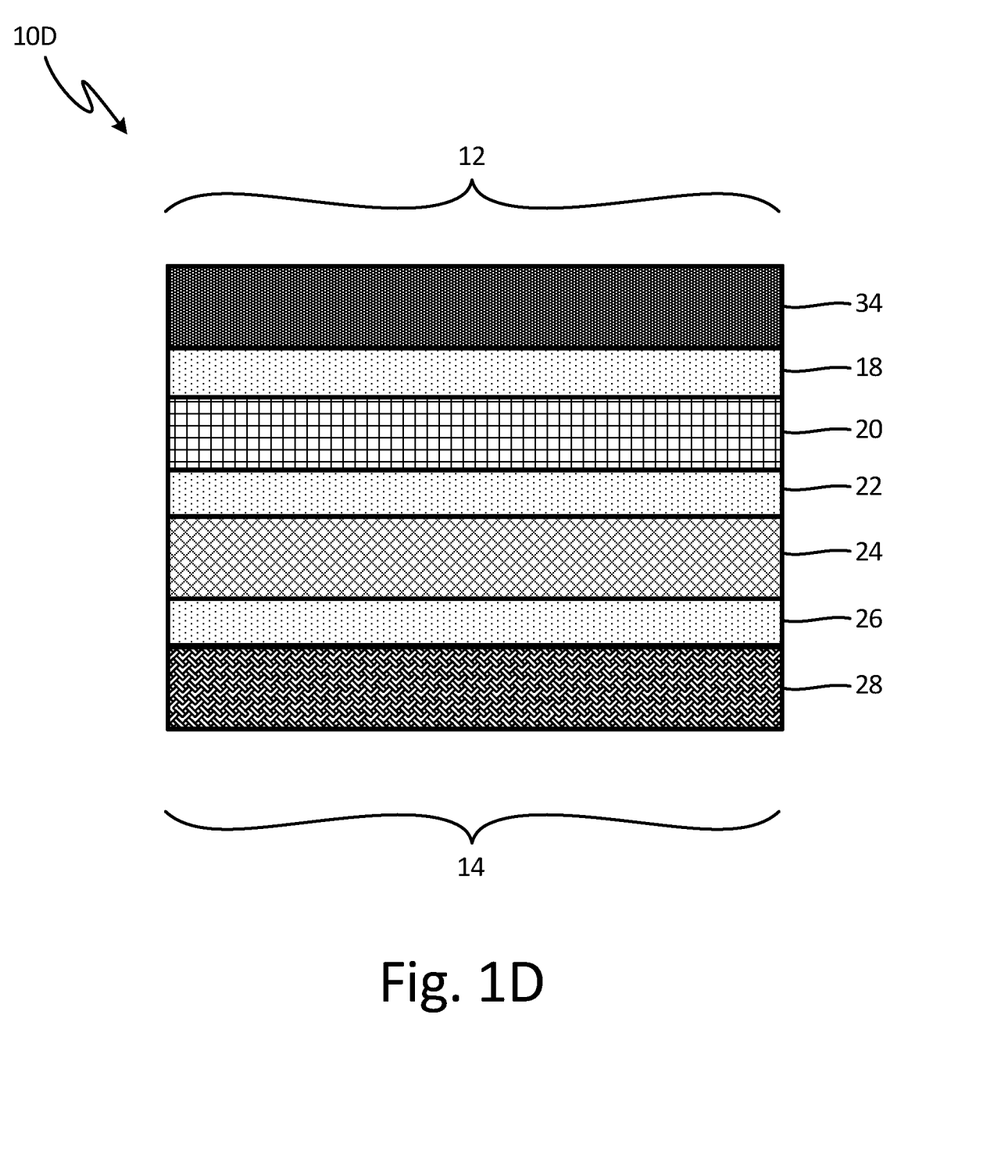
FIG. 1D is a schematic diagram of a thermally conductive, electrically insulated protected heater assembly in a different embodiment.

The embodiments shown in FIG. 1B-1E are variations on assembly 10A shown in FIG. 1A. All elements are the same except where otherwise noted. In FIG. 1B, metallic skin 16 is replaced with carbon fabric skin 30. Carbon pre-preg fabric skin 30 is lighter weight than metallic skin 16, and is durable. In FIG. 1C, carbon nanotube (CNT) pre-preg skin 32 replaces metallic skin 16. CNT pre-preg skin 32 is uniquely beneficial for de-icing because of its high efficiency, light weight, ability to be molded into specific shapes, and durability. In FIG. 1D, CNT filled film skin 34 is used instead of metallic skin 16. Each of the carbon-based skins in FIG. 1B-1D have unique properties and may be more useful in different parts of an aircraft, depending on the needs of that particular aircraft element.

Figure 1E:
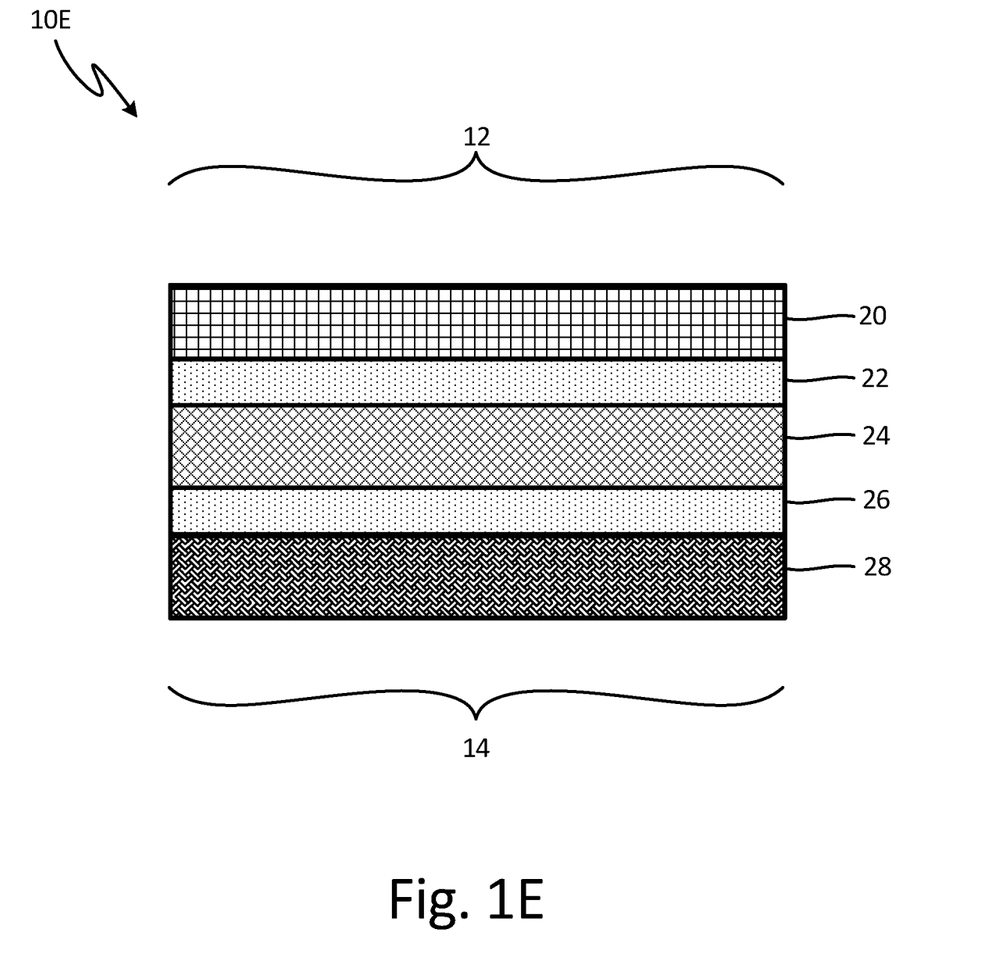
FIG. 1E is a schematic diagram of a thermally conductive, electrically insulated protected heater assembly in a different embodiment.

In FIG. 1E, there is no additional skin layer. Instead, BNNT pre-preg fabric 20 serves as the outermost skin layer in heating assembly 10E. This arrangement still provides FOD protection to electric heater 24 because of BNNT pre-preg fabric 20's strength and durability. But it also minimizes cost and weight by eliminating one layer of the heating assembly. This embodiment is useful in environments where a thicker skin is not needed.

Figure 2:
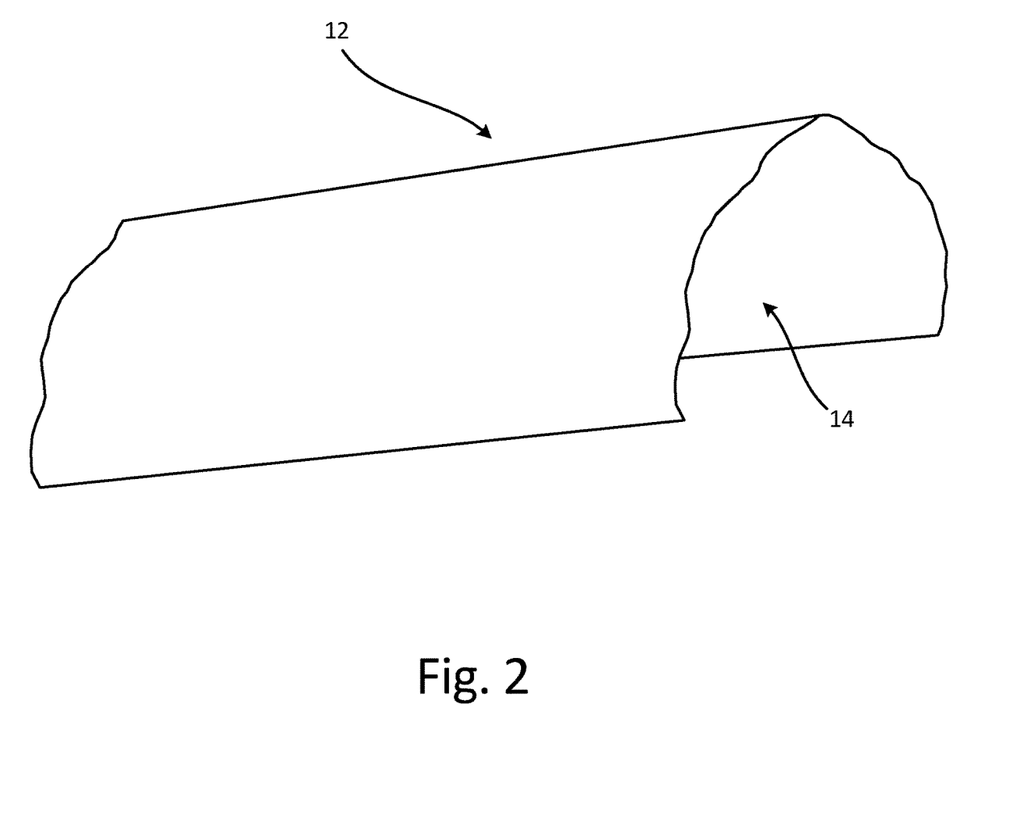
FIG. 2 is a perspective view of heating assembly 10A shown in FIG. 1A.

FIG. 2 shows a perspective view of heating assembly 10A, also pictured as a schematic diagram in FIG. 1A. Assembly 10A is shown as a bendable sheet, which can be formed to an aircraft element (not pictured). Heating assembly 10A is a thin sheet with breeze side 12, facing the external surface subject to icing, and bond side 14, which will be bonded to an aircraft element.

Figure 3:
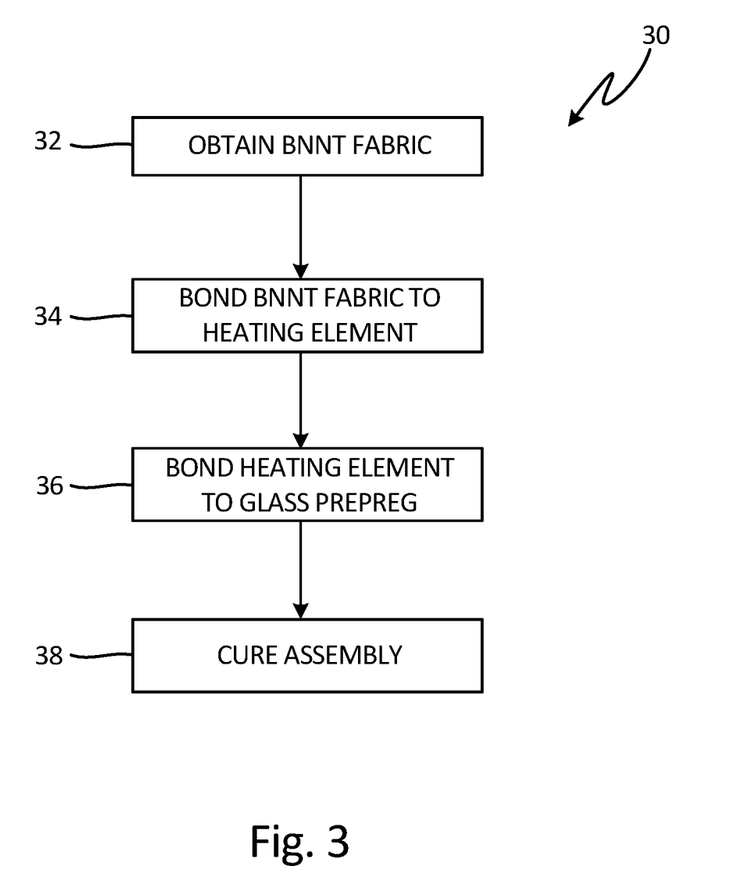
FIG. 3 is a flowchart depicting a method of making a thermally conductive, electrically insulated protected heater assembly.

FIG. 3 is a flowchart depicting method 30 of preparing a thermally conductive, electrically insulated protected heater assembly. Method 30 beings with steps 34 and 36, where the layers of the assembly are adhered together. The layers include a BNNT pre-preg fabric, an electric heater, a pre-preg glass fabric, and at least one adhesive.

The BNNT pre-preg fabric can be commercially obtained or fabricated. If it is fabricated, a BNNT matrix is impregnated with a polymer, such as an epoxy, a phenolic polymer or a bismaleimide. The BNNT matrix impregnated with the polymer is then cured. The resulting BNNT fabric is very strong, thermally conductive and electrically resistant.

The electric heater is typically a sheet heater, and can be a carbon-based or resistive type heater. The glass pre-preg fabric can be commercially obtained, or fabricated. The adhesive is typically a film adhesive which will be used between the layers of the assembly.

The BNNT fabric is bonded to an electric heater with an adhesive. The BNNT fabric can serve as the external protection of the electric heater, or can be layered with a "skin," such as a metallic or carbon-based fabric, to create a tougher protection layer. The BNNT fabric protects the heating element from FOD. The glass pre-preg layer is adhered to the side of the electric heater opposite the BNNT fabric with another film adhesive. The heating element is "sandwiched" between the BNNT fabric and the glass pre-preg.

Finally, in step 38, the assembly is cured to secure the adhesives. The assembly can then be applied to an external surface of an aircraft, such as an airfoil, nacelle, nosecone, engine cowl, or other aircraft part.

The use of a BNNT fabric to protect an electrical heater used for de-icing has several benefits. Generally, for de-icing purposes, electrical heaters should be placed closer to the outside of an aircraft, so heating the surface takes less power. However, the closer a heater is to an external surface, the more likely it will be harmed by foreign object damage, including birds, hail and other surface damage. Thus, the best de-icing heaters are both close to the surface and well protected from FOD.

The BNNT fabric is uniquely good at protecting de-icing heaters because it is both thermally conductive, allowing heat to pass through the BNNT fabric, and electrically insulating, preventing the heaters from being shorted. BNNT fabric is also very strong and capable of mitigating FOD. Additionally, BNNT fabric is acoustically damping, which allows the de-icing heaters to withstand vibrations and maintain longer lifespans. Thus, when BNNT is attached to an electric heater on an aircraft for de-icing, the heater is a low-power heater close to the surface, with an FOD-withstanding heating structure.

Discussion of Possible Embodiments

The following are non-exclusive descriptions of possible embodiments of the present invention.

A heating assembly includes a boron nitride nanotube fabric; a first adhesive; a heating element, wherein the boron nitride nanotube fabric is attached to the heating element by the first adhesive; a second adhesive; and a glass pre-preg fabric, wherein the glass pre-preg fabric is attached to the heating element by the second adhesive on a side of the heating element opposite the boron nitride nanotube fabric.

The assembly of the preceding paragraph can optionally include, additionally and/or alternatively, any one or more of the following features, configurations and/or additional components:

The assembly includes a skin, wherein the skin is attached to the boron nitride nanotube fabric by a third adhesive.

The skin is comprised of a metal, an alloy, or a combination thereof.

The skin is comprised of a carbon pre-preg fabric.

The skin is comprised of a carbon nanotube pre-preg fabric.

The skin is comprised of a carbon nanotube filled film.

The heating element is a nano-carbon heater.

The heating element is a resistive heating element.

The boron nitride nanotube fabric is impregnated with a polymer chosen from the group consisting of an epoxy, a phenolic polymer, or a bismaleimide.

A method for making a heating assembly includes obtaining a boron nitride nanotube fabric; bonding the boron nitride nanotube fabric to a heating element with a first adhesive; bonding the heating element to a glass pre-preg fabric with a second adhesive; and curing the assembly.

The method of the preceding paragraph can optionally include, additionally and/or alternatively, any one or more of the following features, configurations and/or additional components:

The method includes adhering a skin layer to the boron nitride nanotube fabric with a third adhesive.

Obtaining a boron nitride nanotube fabric comprises impregnating a boron nitride nanotube fabric with a polymer and curing the boron nitride nanotube fabric.

The boron nitride nanotube fabric is impregnated with a polymer chosen from the group consisting of an epoxy, a phenolic polymer, or a bismaleimide.

The heater is a nano-carbon heater.

The heater is a resistive heater.

The skin is comprised at least one of a metal or an alloy.

The skin is comprised of a carbon pre-preg fabric.

The method includes curing the assembly after adhering the boron nitride nanotube fabric to the electric heater.

The method includes curing the assembly after adhering the glass pre-preg fabric to the electric heater.

The method includes curing the assembly after adhering the skin to the boron nitride nanotube fabric.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heating assembly comprising:
 a boron nitride nanotube fabric, wherein the boron nitride fabric comprises boron nitride nanotubes impregnated with a polymer selected from the group consisting of an epoxy, a phenolic polymer, a bismaleimide, and combinations thereof, wherein the boron nitride nanotube fabric is cured such that the boron nitride nanotube fabric provides acoustic damping to the heating assembly;
 a first adhesive;
 a heating element, wherein the boron nitride nanotube fabric is attached to the heating element by the first adhesive and the heating element is a nanocarbon heater comprising carbon nanotubes, graphene, or graphene nanoribbons;
 a second adhesive; and
 a glass pre-preg fabric, wherein the glass pre-preg fabric is attached to the heating element by the second adhesive on a side of the heating element opposite the boron nitride nanotube fabric.

2. The assembly of claim 1 and further comprising a skin, wherein the skin is attached to the boron nitride nanotube fabric by a third adhesive.

3. The assembly of claim 2, wherein the skin comprises a material selected from the group consisting of a metal, an alloy, and combinations thereof.

4. The assembly of claim 2, wherein the skin comprises a carbon pre-preg fabric.

5. The assembly of claim 2, wherein the skin comprises a carbon nanotube pre-preg fabric.

6. The assembly of claim 2, wherein the skin comprises a carbon nanotube filled film.

7. The assembly of claim 1, further comprising one or more additional layers.

8. The assembly of claim 7, wherein the one or more additional layers comprise pre-preg fabrics.

9. A method for making a heating assembly, the method comprising:
 bonding a boron nitride nanotube fabric to a heating element with a first adhesive, wherein the heating element is a nanocarbon heater comprising carbon nanotubes, graphene, or graphene nanoribbons and wherein the boron nitride nanotube fabric is formed by steps of:
  impregnating a boron nitride nanotube matrix with a polymer; and
  curing the boron nitride nanotube matrix impregnated with the polymer such that the boron nitride nanotube fabric provides acoustic damping to the heating assembly;
 bonding the heating element to a glass pre-preg fabric with a second adhesive; and
 curing the assembly.

10. The method of claim 9, further comprising adhering a skin layer to the boron nitride nanotube fabric with a third adhesive.

11. The method of claim 9, wherein the boron nitride nanotube fabric is impregnated with a polymer selected from the group consisting of an epoxy, a phenolic polymer, a bismaleimide, and combinations thereof.

12. The method of claim 10, wherein the skin comprises at least one of a metal or an alloy.

13. The method of claim 10, wherein the skin comprises a carbon pre-preg fabric.

14. The method of claim 10, further comprising attaching a second skin to the nano first skin with a film adhesive.

15. The method of claim 9, further comprising attaching a second pre-preg fabric to the glass pre-preg fabric with an adhesive.

16. The method of claim 9, wherein curing the assembly including more than one curing step.

* * * * *